Nov. 7, 1967 P. SWIFT 3,351,872
SELF-STARTING ASTABLE MULTIVIBRATORS
Filed Sept. 1, 1965
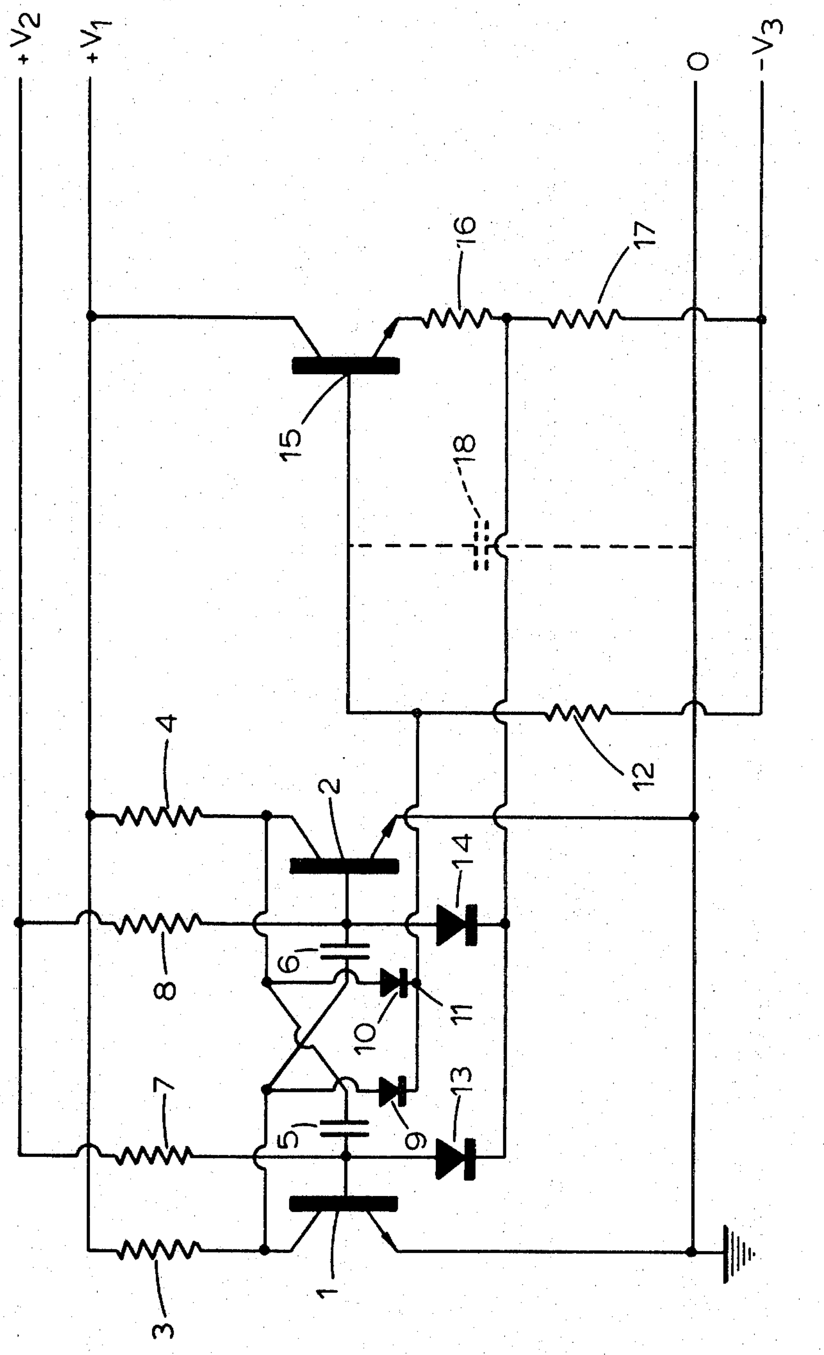
INVENTOR.
PETER SWIFT
BY
AGENT United States Patent Office 3,351,872
Patented Nov. 7, 1967

3,351,872

SELF-STARTING ASTABLE MULTIVIBRATORS

Peter Swift Horley, Surrey, England, assignor to North American Philips Company, Inc., New York, N.Y., a corporation of Delaware Filed Sept. 1, 1965, Ser. No. 484,247
Claims priority, application Great Britain, Nov. 25, 1964, 47,909/64, Patent 1,026,894
6 Claims. (Cl. 331—113)

ABSTRACT OF THE DISCLOSURE

A two transistor multivibrator circuit wherein self starting is assured by connecting the base and collector electrodes of the two transistors respectively through diodes to two points of appropriate potential, thereby to prevent the simultaneous saturation of both transistors when the circuit is initially turned on.

This invention relates to transistorized astable multivibrator circuits.

Such multivibrators are known. In practice it has been found that they may at times refuse to start oscillating when power is applied. This may occur when, upon switching on, both transistors attain a state such that the total gain around the oscillation positive feedback loop is less than one. For example, if the transistors are capacitively coupled to one another, and if the power supply is applied to them gradually, both transistors may attain a saturated state at the same time i.e., both transistors may simultaneously conduct with a large base current so that the voltage drop between collector and emitter is small and the working point of the transistor is below the bend of the emitter-collector current curve. As a result the multivibrator refuses to start. This is a disadvantage in many applications and it may even result in damage to the components of associated circuitry due, for example, to a loss of bias on other transistors.

One manner of overcoming the starting difficulty is disclosed in Figure 28–6 of the book "Transistor Circuit Design" by T. A. Walston and J. R. Miller, published by McGraw-Hill (1963). In this arrangement, leakage resistors are utilized which are connected to the control electrodes of the first and second transistors of the multivibrator and are returned to the common point of two diodes which are connected back-to-back between the output electrodes of said first and second transistors; in this way, a potential lying between the high potential of the circuit and ground potential is set up at this common point. If the multivibrator should continue to operate with both transistors saturated, then this potential stays very near to ground potential; this results in the control electrodes being biased in the reverse, or blocking, direction thus removing the transistors from their saturated state and allowing the circuit to start oscillating. The potential at the common point is then carried towards the high voltage line so that the required operating bias on the transistors is obtained.

The potential to which the leakage resistors are returned is one of the factors which determine the operating frequency of the multivibrator; it is often required to vary the operating frequency by varying this potential during operation. It will be seen that, in the known circuit, it is difficult to vary this potential without altering the values of the components of the circuit. For this reason it is often more convenient to vary the values of the leakage resistors themselves, which values also determine the operating frequency of the multivibrators. However, if means are provided for manually altering the values of the leakage resistors, it often results that much longer leads are required for connection to the resistors, and this may be detrimental to the operation of the circuit, especially when ocillation at high frequencies is required.

It is an object of the invention to provide a transistorized astable multivibrator in which the operating frequency may be easily and effectively varied.

Other objects of the invention are: to provide a transistorized astable multivibrator which always starts when power is applied and whose operating frequency may be effectively varied; and to provide a multivibrator of the above type whose operating frequency may be controlled by an externally generated voltage.

According to one aspect of the invention, an astable multivibrator circuit arrangement comprises first and second transistors and starting means for setting the multivibrator into oscillation. The starting means includes first and second rectifiers connected back-to-back between a given oscillation phase load circuit of said first transistor and an opposite oscillation phase load circuit of said second transistor. The common point of said rectifiers is D.C. coupled to a load; third and fourth rectifiers are connected back-to-back between an input electrode circuit of said first transistor and an input electrode circuit of said second transistor and said load is D.C. coupled to the common point of said third and fourth rectifiers, whereby said load circuits are D.C. coupled with said input electrodes.

The rectifiers must be connected with polarities such that, in the event both transistors become saturated, a bias is applied to said input electrodes via the rectifiers in order to reverse bias said transistors. The circuit must also be such that, when it is oscillating, the third and fourth rectifiers are reverse-biased so that they do not interfere with the oscillations.

It is not essential that the rectifiers, especially the third and fourth rectifiers, have low forward-resistance; the operation of the circuit is not substantially impaired even if the rectifiers have an appreciable forward-resistance.

The said input and output electrodes may be the bases and collectors respectively of the two transistors, if the transistors are connected in the grounded-emitter configuration.

A capacitor may be provided for smoothing the potential applied to the third and fourth rectifiers via the load.

According to another aspect of the invention, a third transistor may be included in the coupling between the load and the third and fourth rectifiers. This transistor may be connected in the grounded emitter configuration and the load may be coupled with the base of this third tarnsistor with the third and fourth rectifiers being coupled with a second load included in the emitter circuit of said third transistor.

Other objects and features of the invention will be apparent from the following description of a preferred embodiment thereof, as illustrated in the single figure of the accompanying diagrammatic drawing.

In the figure, reference numerals 1 and 2 denote first and second transistors respectively. These transistors are connected in the grounded-emitter configuration to form a multivibrator, their collector loads being resistors 3 and 4 repsectively, returned to a potential $+V_1$; cross-coupling is achieved by means of the capacitors 5 and 6 connected to the input electrodes, i.e. the bases; base leak resistors 7 and 8 are returned to a potential $+V_2$. The oscillation waveform may be obtained in either phase by means (not shown) connected to either of the collector output electrodes. First and second rectifiers 9 and 10 are connected back-to-back between the collector load circuits of transistors 1 and 2. The common point 11 of the first and second rectifiers is D.C. coupled with a load 12, the latter being returned to a potential $-V_3$. Load 12 is in turn D.C. coupled with third and fourth rectifiers 13 and 14 connected back-to-back between the base circuits of the transistors 1 and 2; this coupling may advantageously include a third transistor 15 connected in the grounded collector configuration as shown. Load 12 is coupled with the base of transistor 15 and the rectifiers 13 and 14 are coupled with a second split load comprising resistors 16 and 17 connected in series in the emitter circuit of transistor 15. A capacitor 18 (shown dotted) may be provided for smoothing the potential applied to the rectifiers 13 and 14 via the load 12.

The circuit arrangement operates as follows:

If the multivibrator should refuse to oscillate with both transistors 1 and 2 saturated, the potential at their collectors, and hence at the anodes of rectifiers 9 and 10, is at just above ground. Thus the base of transistor 15 is held at this potential (assuming zero forward resistance in rectifiers 9 and 10, although this need not necessarily be the case) and the emitter potential of transistor 15 (which is connected as an emitter-follower) is slightly more negative. The potential at the junction of resistors 16 and 17 is therefore also comparatively low, and this low potential is applied to the bases of transistors 1 and 2 via rectifiers 13 and 14. Thus transitsors 1 and 2 are reverse-biased and hence removed from their saturated state and the circuit starts oscillating. As soon as this occurs, the output waveform of the circuit appears at the collectors of transistors 1 and 2 and hence at the anodes of diodes 9 and 10. The common point 11 then assumes a potential equal to the most positive excursion of these collectors; this potential may be smoothed if necessary by the inclusion of capacitor 18, shown returned to ground, although it may be returned to any point having a substantially constant potential. Thus transistor 15 becomes more forward biased, the potential at the junction of resistors 16 and 17 becoming more positive than the bases of transistors 1 and 2. If the circuit component values are suitably chosen this may be arranged to cause rectifiers 13 and 14 to become reverse-biased with the result that the bases of transistors 1 and 2 are allowed to assume their normal operating potential.

As an alternative the transistor 15 together with resistors 16 and 17 may be omitted; when this is done, the common point of rectifiers 13 and 14 is connected to a point on load resistor 12 at which the desired potentials are obtained.

The operating frequency of the arrangement may be varied by varying the value of $+V_2$. If such variation is not desired, then the $+V_2$ line may be connected to the $+V_1$ line.

Suitable component values for the circuit arrangement shown in the drawing are, for example:

| | |
|---|---|
| Transistor **1** | Mullard Type BSY 39. |
| Transistor **2** | Mullard Type BSY 39. |
| Transistor **15** | Mullard Type BSY 39. |
| Resistor **3** | 1KΩ. |
| Resistor **4** | 1KΩ. |
| Resistor **7** | 6.8KΩ. |
| Resistor **8** | 6.8KΩ. |
| Resistor **12** | 10KΩ. |
| Resistor **16** | 220Ω. |
| Resistor **17** | 2.2KΩ. |
| Capacitor **5** | 4,700 pf. |
| Capacitor **6** | 4,700 pf. |
| Capacitor **18** | 4,700 pf. |
| Diode **9** | Mullard Type OA81. |
| Diode **10** | Mullard Type OA81. |
| Diode **13** | Mullard Type BAY 38. |
| Diode **14** | Mullard Type BAY 38. |
| $+V_1$ | 12 volts. |
| $+V_2$ | 12 volts (variable). |
| $-V_3$ | −12 volts. |

While the invention has been particularly shown and described with reference to a preferred embodiment thereof, it will be understood by those skilled in the art that various changes in form and details may be made therein without departing from the spirit and scope of the invention.

What is claimed is:

1. A self-starting astable multivibrator circuit arrangement comprising: first and second transistors each having at least an input electrode circuit and an output electrode circuit, said input and output circuits being cross-coupled to connect said transistors in astable multivibrator relationship, first and second rectifiers connected back-to-back between a given oscillation phase output electrode circuit of said first transistor and an opposite oscillation phase output electrode circuit of said second transistor, each of said rectifiers being poled in the reverse direction with respect to current flow through the respective output electrode, a load connected between the common point of said rectifiers and a point at reference potential, third and fourth rectifiers connected back-to-back between an input electrode circuit of said first transistor and an input electrode circuit of said second transistor, each of said latter rectifiers being poled in the reverse direction with respect to current flow through the respective input electrode, and a direct current conductive coupling from said load to the common point of said third and fourth rectifiers.

2. A circuit arrangement as claimed in claim 1, further including a smoothing capacitor connected in parallel with the said load.

3. A self-starting astable multivibrator circuit arrangement comprising: first and second transistors each connected in grounded-emitter configuration each having at least a base input circuit and a collector output circuit, said input and output circuits being cross-coupled to connect said transistors in astable multivibrator relationship, first and second rectifiers connected back-to-back between a given oscillation phase collector output circuit of said first transistor and an opposite oscillation phase collector output electrode circuit of said second transistor, each of said rectifiers being poled in the reverse direction with respect to current flow through the respective output electrode, a load connected between the common point of said rectifiers and a point at reference potential, third and fourth rectifiers connected back-to-back between the base input circuit of said first transistor and the base input circuit of said second transistor, each of said latter rectifiers being poled in the reverse direction with respect to current flow through the respective input electrode, and a direct current conductive coupling from said load to the common point of said third and fourth rectifiers.

4. A circuit arrangement as claimed in claim 3, further including a smoothing capacitor connected in parallel with the said load.

5. A self-starting astable multivibrator circuit arrangement comprising: first and second transistors each having at least an input electrode circuit and an output electrode circuit, said input and output circuits being cross-coupled to connect said transistors in astable multivibrator relationship, first and second rectifiers connected back-to-back between a given oscillation phase output electrode circuit of said first transistor and an opposite oscillation phase output electrode circuit of said second transistor, each of said rectifiers being poled in the reverse direction with respect to current flow through the respective output electrode, a load connected between the common point of said rectifiers and a point at reference potential, third and fourth rectifiers connected back-to-back between an input electrode circuit of said first transistor and an input electrode circuit of said second transistor, each of said latter rectifiers being poled in the reverse direction with respect to current flow through the respective input electrode, a direct current conductive coupling from said load to the common point of said third and fourth rectifiers, comprising a third transistor having an input electrode connected to said load and an output electrode connected to the common point of said third and fourth rectifiers.

6. A self-starting astable multivibrator circuit arrangement comprising: first and second transistors each having at least an input electrode circuit and an output electrode circuit, said input and output circuits being cross-coupled to connect said transistors in astable multivibrator relationship, first and second rectifiers connected back-to-back between a given oscillation phase output electrode circuit of said first transistor and an opposite oscillation phase output electrode circuit of said second transistor, each of said rectifiers being poled in the reverse direction with respect to current flow through the respective output electrode, a load connected between the common point of said rectifiers and a point at reference potential, third and fourth rectifiers connected back-to-back between an input electrode circuit of said first transistor and an input electrode circuit of said second transistor, each of said latter rectifiers being poled in the reverse direction with respect to current flow through the respective input electrode, a third transistor connected in grounded-collector configuration and having a base electrode connected to said load, a load impedance connected to the emitter of said third transistor, and means connecting said load impedance to the common point of said third and fourth rectifiers.

References Cited

UNITED STATES PATENTS 3,241,087 3/1966 Gossel -------------- 311—113

ROY LAKE, *Primary Examiner.*

S. H. GRIMM, *Assistant Examiner.*